United States Patent [19]

Mull, Jr. et al.

[11] Patent Number: 5,687,768
[45] Date of Patent: Nov. 18, 1997

[54] CORNER FOILS FOR HYDRAULIC MEASUREMENT

[75] Inventors: Ted V. Mull, Jr., Akron; Melvin J. Albrecht, Homeworth; Jeffrey A. LaRose, Stow; Mitchell W. Hopkins, Uniontown, all of Ohio

[73] Assignee: The Babcock & Wilcox Company, New Orleans, La.

[21] Appl. No.: 588,495

[22] Filed: Jan. 18, 1996

[51] Int. Cl.$^6$ .................... B21D 39/00; G01F 1/46
[52] U.S. Cl. .................... 138/39; 137/561 A; 73/861.66; 138/37
[58] Field of Search .................... 138/39, 37, DIG. 4, 138/DIG. 10; 137/561 A; 29/513; 428/597; 73/861.66, 861.63, 198

[56] References Cited

U.S. PATENT DOCUMENTS

| | | | |
|---|---|---|---|
| 1,837,901 | 12/1931 | Föttinger et al. | |
| 2,216,046 | 9/1940 | Peck | 285/211 |
| 2,292,246 | 8/1942 | Steffens | 138/39 |
| 2,396,826 | 3/1946 | Callan | 138/39 X |
| 2,826,221 | 3/1958 | Speiser | 138/39 |
| 2,861,597 | 11/1958 | Gracer | 138/39 |
| 2,884,956 | 5/1959 | Perlin | 138/39 X |
| 2,959,195 | 11/1960 | Gracer | 138/39 X |
| 2,972,358 | 2/1961 | Hinden | 138/39 X |
| 3,050,160 | 8/1962 | Chesser | 138/39 X |
| 3,105,520 | 10/1963 | Lorett et al. | 138/39 |
| 3,144,204 | 8/1964 | Bohanon | 138/39 X |
| 3,224,668 | 12/1965 | Olmsted et al. | 138/39 X |
| 3,310,287 | 3/1967 | Clark et al. | 138/39 X |
| 3,381,713 | 5/1968 | Jacobsen | 138/39 |
| 3,405,737 | 10/1968 | Harper | 138/39 |
| 3,494,379 | 2/1970 | Hinden | 138/39 X |
| 3,602,262 | 8/1971 | Hinden | 138/39 |
| 4,019,537 | 4/1977 | Bonnard et al. | 138/37 |
| 4,467,829 | 8/1984 | Myers | 137/561 A |
| 4,586,540 | 5/1986 | DeLord | 138/39 |
| 4,594,888 | 6/1986 | DeBaun et al. | 73/861.66 X |
| 4,641,684 | 2/1987 | DeLord | 137/561 A |
| 4,706,910 | 11/1987 | Walsh et al. | 244/130 |
| 4,823,615 | 4/1989 | Taha | 73/861.66 |
| 4,911,205 | 3/1990 | Myers | 138/39 |
| 4,919,170 | 4/1990 | Kallinich et al. | 138/39 |
| 4,995,426 | 2/1991 | Hinden | 138/39 |
| 5,181,314 | 1/1993 | Lyons et al. | 29/796 |
| 5,213,138 | 5/1993 | Presz, Jr. | 138/39 |
| 5,230,369 | 7/1993 | Presz, Jr. | 138/39 |
| 5,327,940 | 7/1994 | Presz, Jr. | 138/39 |
| 5,402,687 | 4/1995 | Brandt, Jr. | 73/861.66 |
| 5,405,106 | 4/1995 | Chintamani et al. | 138/39 X |
| 5,529,092 | 6/1996 | Arnoldt | 137/561 A X |

FOREIGN PATENT DOCUMENTS

| | | | |
|---|---|---|---|
| 944405 | 3/1974 | Canada | 138/39 |
| 750517 | 2/1933 | France | 138/39 |
| 750517 | 1/1979 | France | 138/39 |
| 595054 | 3/1934 | Germany | 138/39 |
| 1557612 | 12/1979 | United Kingdom . | |

OTHER PUBLICATIONS

"Duro Vane Rail" Sheet Metal Worker, pp. 28 and 85, Oct. 1953.
"Tuttle and Bailey Ducturns", Tuttle and Bailey Catalog #41, p. 50, Oct. 1942.
"Steam/Its Generation and Use", 40th ed., The Babcock & Wilcox Company, pp. 3–13 to 3–17, 1992.

*Primary Examiner*—Patrick Brinson
*Attorney, Agent, or Firm*—Robert P. Bennett, Jr.; Robert J. Edwards

[57] ABSTRACT

An arrangement of air foils in a duct bend for channeling an air flow through the duct in a manner which enhances the accuracy of pressure measurements taken at one or more points in the channels formed in the duct between the air foils.

8 Claims, 2 Drawing Sheets

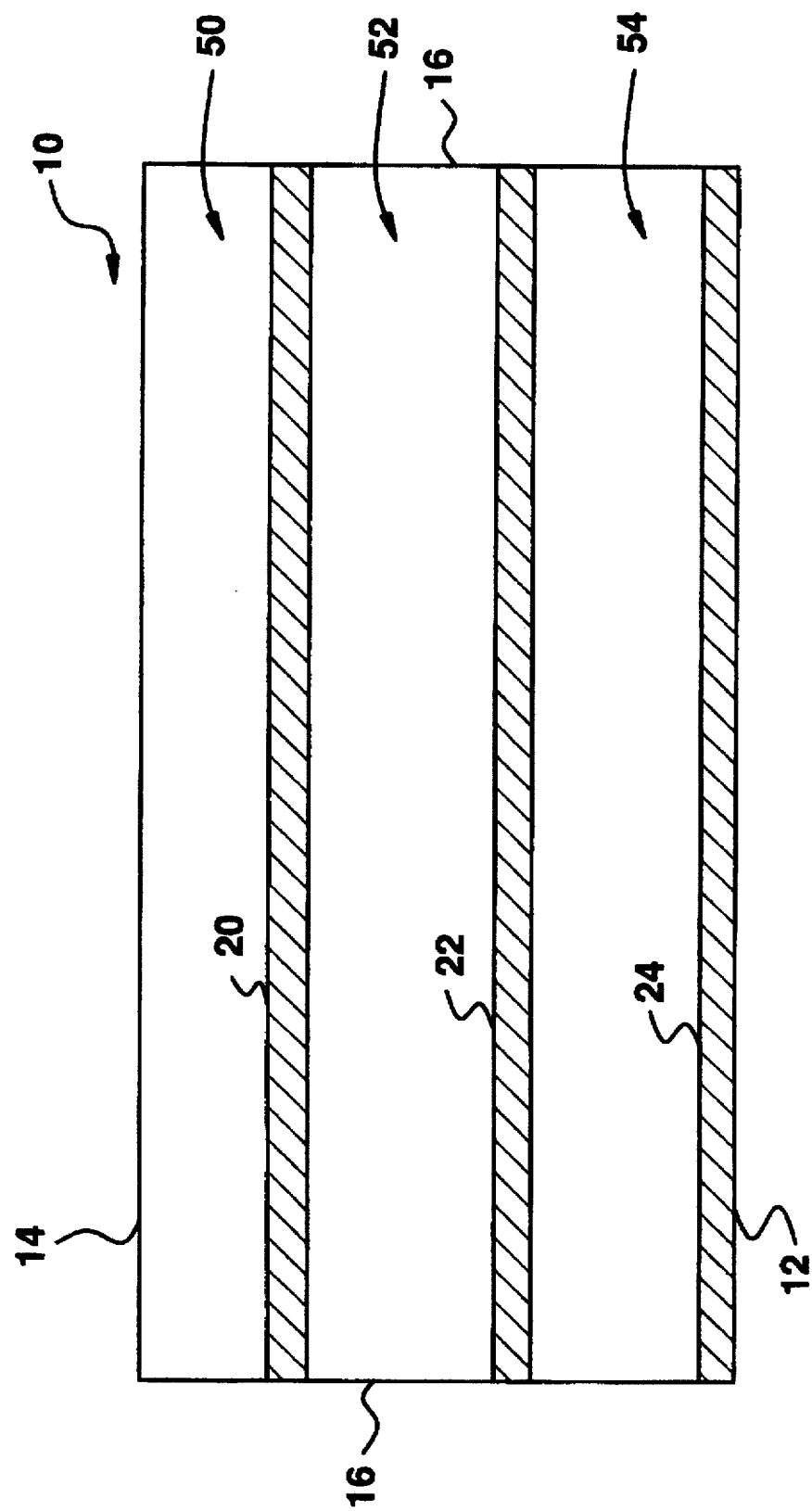

CORNER FOILS FOR HYDRAULIC MEASUREMENT

BACKGROUND OF THE INVENTION

1. Field of the Invention

The present invention relates to a flow measurement device for measuring the velocity of a fluid traveling through the turning sections of an air supply duct bend located between a forced draft fan and a secondary air windbox of a furnace.

2. Description of the Related Art

As a general rule, conventional fluid velocity measurement devices require uniform, linear duct regions to yield accurate air flow measurements. Straight, unobstructed ductwork having a length equivalent to several duct diameters, preceding the measurement device location, is required to ensure that proper fluid flow conditions exist at the measurement location. Unfortunately, some air duct systems contain no such regions, and any measurement taken in those systems will be less than accurate.

The use of turning vanes in rectangular elbow ducts to improve air flow through a bend is known. The usefulness of turning vanes for limiting pressure drops in a bend and for improving airflow through the bend is described at page 3-13 of *Steam/Its Generation And Use* (40th Ed.) which has been published by The Babcock & Wilcox Company. The effect of the vanes is to increase the velocity and reduce pressure drop through the bend. Turning vanes, however, are generally thin and occupy little cross-sectional area.

Examples of duct guide vanes can be found in several U.S. patents.

U.S. Pat. No. 3,405,737 to Harper discloses a plurality of double vanes attached perpendicular to a rail, which is connected to the opposite corners of a duct bend. The vanes are situated in the middle of the duct. The vanes extend between the top of the duct bend and the rail, forming channels between their concave and convex surfaces parallel to the duct bend.

U.S. Pat. No. 4,919,170 to Kallinich discloses a similar configuration to Harper. The flow guide elements of the Kallinich '170 patent are thin sheets oriented parallel to the duct bend. The flow guide elements in Kallinich are shorter at the inner corner of the duct bend than at the outer duct bend. The flow guides of the Kallinich '170 patent are disclosed to be used in a flue located between a power plant boiler and a flue gas-cleaning plant. However, the invention of Kallinich '170 is different from that of the present invention because the guides are thin.

The known corner foils are used primarily for directing air through a duct rather than channeling it into discrete flows for measurement. Also, the known corner foils attempt to reduce pressure changes and to maintain the same flow through duct bends. Many of the corner foils are continuous curves and therefore, do not provide straight segments between them, as required for accurate airflow measurements.

SUMMARY OF THE INVENTION

It is therefore, a primary object of the present invention to provide a suitable region in the bending sections of furnace ductwork for taking accurate pressure measurements in order to determine the velocity of the fluid flowing through the duct.

Accordingly, the proposed invention provides an apparatus for creating an acceptable flow environment in turning sections of a secondary air ductwork system. Means are provided for creating a region containing the proper fluid flow conditions. The means create regions in the turning sections, having increased fluid velocity which is suitable for obtaining accurate measurements of the fluid flow through the duct work.

The means comprises a plurality of segmented air foils which are placed across the width of a rectangular duct. The air foils have discrete segments which create straight channels between the air foils and the duct walls. Additionally, in one embodiment, a small plate is provided between one of the air foils and the inner duct wall to further straighten the fluid flow through the channel. The air foils are tapered more at the leading edge facing the fluid flow than at the trailing edge, where the fluid flow is allowed to expand back to the full width of the duct.

Apparatus for measuring the fluid flow is located in the straight channel regions between the air foils. The measurement apparatus may be oriented in any known manner most beneficial in obtaining an accurate measurement. The measurement apparatus is used to obtain a measurement of the fluid pressure in these regions, which can be used to determine the fluid velocity in the duct.

The pressure sensing device, senses both static and dynamic pressures of the fluid within the straight channel regions of the duct and transmits the magnitude of the pressure to another device such as a pressure transmitter which is capable of measuring the pressure differential. From the pressure transmitter, the information is relayed to a device capable of making calculations from the information and then displaying the fluid velocity based on the calculations.

The various features of novelty which characterize the invention are pointed out with particularity in the claims annexed to and forming a part of the disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a sectional view taken along line 2—2 of FIG. 1.

DESCRIPTION OF THE PREFERRED EMBODIMENTS

Figure 1:
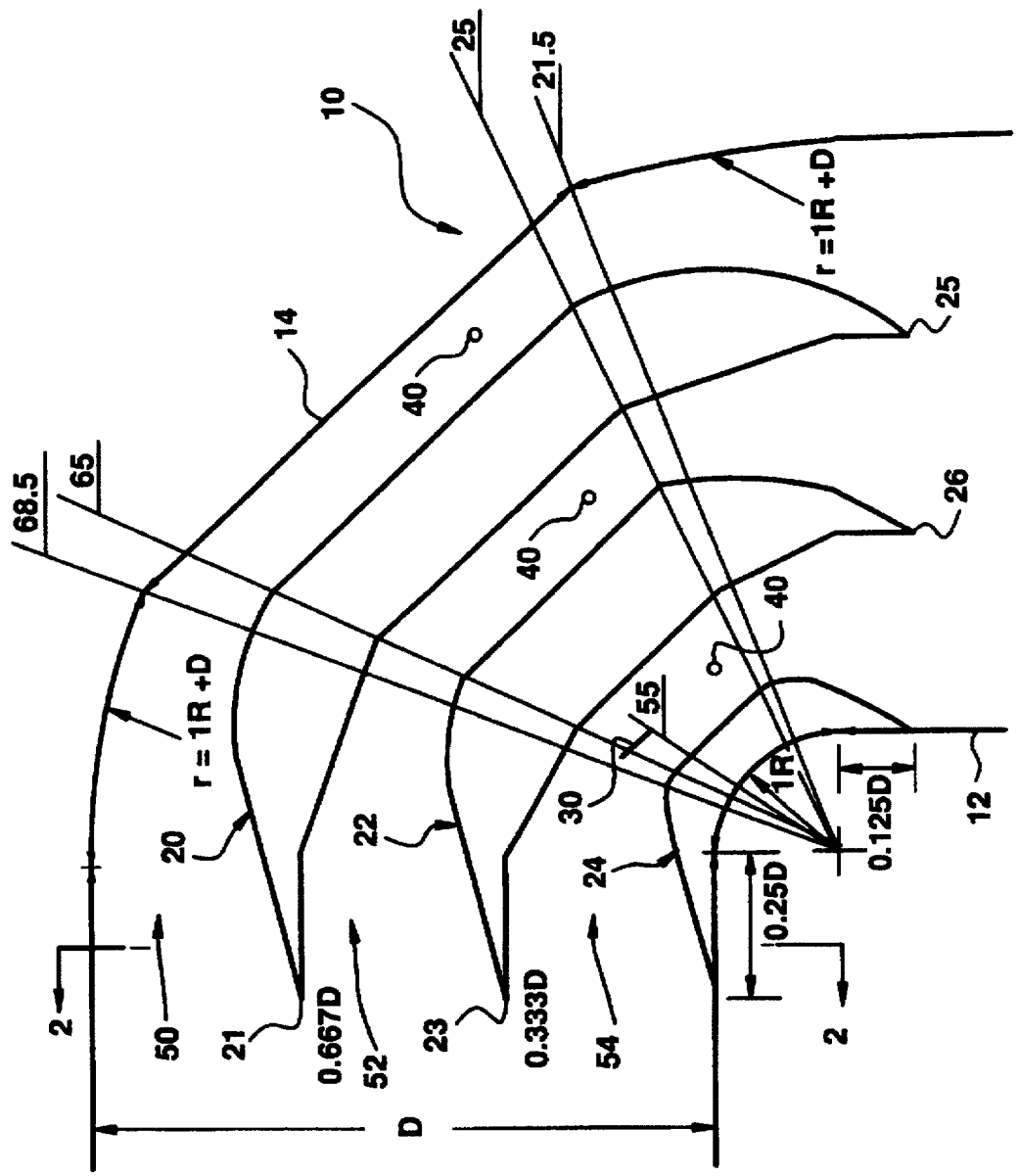
FIG. 1 is a plane view of a ductwork bend incorporating the present invention.

Referring now to the drawings in which like numerals are used to refer to the same or similar elements, FIG. 1 shows a section of a duct bend 10. The duct bend 10 is formed by inner duct wall 12 and outer duct wall 14, which are substantially parallel to each other. However, inner duct wall 12 has a arcuate shape, while outer duct wall 14 has a straight, flattened segment in between arcuate portions which forms the bend in the duct wall. The inner and outer duct walls 12, 14 are airtightly joined by duct side walls 16 (not shown in FIG. 1).

Inside duct bend 10 are first corner air foil 20, second corner air foil 22 and inner corner air foil 24. The air foils 20, 22 and 24 are substantially equally spaced between inner duct wall 12 and outer duct wall 14. The air foils 20, 22, 24 extend across the width of the duct bend 10 and have outer channel 50, middle channel 52 and inner channel 54 between them.

The first and second air foils 20 and 22 have leading edges 21 and 23 respectively, which are more tapered and elongated than their trailing edges 25 and 26 respectively. The air foils substantially reduce the total volume within the duct through which air passing through the duct may flow. The air is forced into the channels 50, 52, 54, where the pressure increase may be measured at pressure measurement points 40, shown within channels 50, 52, 54. Pressure measurement points 40 are connected to any known pressure measurement device (not shown) which can transmit the measurements to a processing and display device.

Also, thin plate 30 may be located within channel 54. The plate 30 is to further assist in straightening the air flow through channel 54, created by second corner air foil 22 and inner corner air foil 24.

Turning to FIG. 2, the channels 50, 52 and 54 created by the corner air foils 20, 22 and 24 can be seen to extend across the width of the duct bend 10. This view shows the leading edge ends of the foils 20, 22 and 24 and channels 50, 52 and 54. The foils are located essentially equidistantly between outer duct wall 14 and inner duct wall 12. The corner air foils 20, 22 are securely connected to side walls 16.

In a preferred shape for the first and second corner air foils, the leading edges 21 and 23 are created by a tapered section which has a length which is approximately ¼ of the duct height. The duct height is the shortest distance between the inner duct wall 12 and the outer duct wall 14. Trailing edges 25 and 26 of the corner foils 20 and 22, are formed by a taper having a length which is approximately ⅛ of the height of the duct 10.

The middle sections of the air foils 20 and 22 can be of different widths depending on the desired size of the channels between them. One possible set of values for the width, however, is ⅕ the height of the duct for both corner foils 20 and 22. Inner corner air foil 24, which is securely fixed to inner duct wall 12, has a thickness which is equal to about ¹⁄₁₀ of the height of the duct.

Each of the corner air foils has a substantially straight section between the leading edges 21, 23 and the trailing edges 25, 26 having a length proportional to the length of the straight section of outer duct wall 14. In a preferred embodiment, the straight channel segments of the air foils 20, 22, 24 lie within an angle formed by lines extending between the ends of the straight section of the outer duct wall 14 and the center of a circle on which the arcuate portion of the inner duct wall 12 lies.

While a specific embodiment of the invention has been shown and described in detail to illustrate the application of the principles of the invention, it will be understood that the invention may be embodied otherwise without departing from such principles.

What is claimed is:

1. A fluid flow pressure measurement system having a corner air foil arrangement for channeling a fluid flow through a bend of a rectangular duct of a furnace, the arrangement for creating a region within the bend, having increased fluid velocity which is suitable for obtaining accurate pressure measurements, the system comprising:

an outer duct bend wall having a flat, straight portion between two arcuate portions, the wall forming a bend;

an inner duct bend wall having an arcuate portion forming a bend, the arcuate portion defining an arc of a circle having a center outside the duct bend;

a pair of flat duct side walls airtightly connecting the outer duct bend and inner duct bend at a constant distance apart;

an inner corner air foil having a bottom surface continuously connected to the inner duct bend wall between the side walls, an outer surface, a leading edge, and a trailing edge;

at least one corner air foil attached to the pair of side walls within the duct bend, oriented substantially parallel to the outer duct bend wall and between the outer duct bend wall and inner duct bend wall, each air foil having a leading edge, a trailing edge, and at least one substantially straight section between the leading edge and the trailing edge forming at least two substantially straight channels between the at least one substantially straight section, the outer duct bend wall and the inner corner air foil within the duct bend; and means, located within the at least two substantially straight channels, for measuring a static and a dynamic pressure of the fluid flow through the channels.

2. The pressure measurement system according to claim 1, further comprising a thin plate located between the inner corner air foil and at least one corner air foil within the substantially straight channel adjacent the inner corner air foil, the thin plate extending across the width of the duct bend and attached to the pair of side walls and oriented parallel to the substantially straight channel.

3. The pressure measurement system according to claim 2, wherein the at least one corner air foil is tapered more at the leading edge than at the trailing edge.

4. The pressure measurement system according to claim 3, wherein the at least one corner air foil is a first corner air foil and a second corner air foil.

5. The pressure measurement system according to claim 4, wherein the substantially straight sections of the corner air foils are within an angle formed by extending a pair of radii of the circle on which the arcuate portion of the inner duct bend wall lies, to each of a first end and a second end of the straight portion of the outer duct bend wall.

6. The pressure measurement system according to claim 5, wherein the straight sections of the first and second corner air foils have a thickness equal to at least one-sixth the distance between the outer duct wall and the inner duct wall.

7. The pressure measurement system according to claim 6, wherein the leading edge tapered portion has a length equal to one fourth of the distance between the outer duct wall and the inner duct wall.

8. The pressure measurement system according to claim 7, wherein the trailing edge tapered portion has a length equal to one eighth of the distance between the outer duct wall and the inner duct wall.

* * * * *